US 6,548,308 B2

(12) United States Patent
Ellson et al.

(10) Patent No.: US 6,548,308 B2
(45) Date of Patent: Apr. 15, 2003

(54) FOCUSED ACOUSTIC ENERGY METHOD AND DEVICE FOR GENERATING DROPLETS OF IMMISCIBLE FLUIDS

(75) Inventors: Richard N. Ellson, Palo Alto, CA (US); Mitchell W. Mutz, Palo Alto, CA (US); James K. Foote, Cupertino, CA (US)

(73) Assignee: Picoliter Inc., Sunnyvale, CA (US)

( * ) Notice: Subject to any disclaimer, the term of this patent is extended or adjusted under 35 U.S.C. 154(b) by 0 days.

(21) Appl. No.: 09/962,730

(22) Filed: Sep. 24, 2001

(65) Prior Publication Data

US 2002/0037375 A1 Mar. 28, 2002

Related U.S. Application Data

(63) Continuation-in-part of application No. 09/669,194, filed on Sep. 25, 2000, now abandoned.

(51) Int. Cl.⁷ .............................. B01L 3/02; B41J 2/04
(52) U.S. Cl. ..................... 436/180; 347/46; 422/100; 436/57; 436/71; 436/73; 436/86; 436/94
(58) Field of Search ........................... 347/46; 422/100; 436/180, 177, 71, 73, 57, 94, 86

(56) References Cited

U.S. PATENT DOCUMENTS

| 3,986,669 A | 10/1976 | Martner |
| 4,089,801 A | 5/1978 | Schneider |
| 4,308,547 A | 12/1981 | Lovelady et al. |
| 4,697,195 A | 9/1987 | Quate et al. |
| 4,719,476 A | 1/1988 | Elrod et al. |
| 4,734,706 A * | 3/1988 | Le et al. ............... 347/71 |
| 4,751,529 A | 6/1988 | Elrod et al. |
| 4,751,530 A | 6/1988 | Elrod et al. |
| 4,751,534 A | 6/1988 | Elrod et al. |
| 4,797,693 A | 1/1989 | Quate |
| 4,801,411 A | 1/1989 | Wellinghoff et al. |
| 4,801,953 A | 1/1989 | Quate |
| 4,812,856 A | 3/1989 | Wallace |
| 4,956,999 A * | 9/1990 | Bohannan et al. ........... 73/587 |
| 4,959,674 A | 9/1990 | Khri-Yakub et al. |
| 5,041,849 A | 8/1991 | Quate et al. |
| 5,087,931 A | 2/1992 | Rawson |
| 5,122,818 A | 6/1992 | Elrod et al. |
| 5,216,451 A | 6/1993 | Rawson et al. |
| 5,229,016 A | 7/1993 | Hayes et al. |
| 5,229,793 A | 7/1993 | Hadimioglu et al. |

(List continued on next page.)

FOREIGN PATENT DOCUMENTS

| DE | 19752585 A1 | 6/1999 |
| EP | 0434931 A2 | 7/1991 |
| GB | 1069048 * | 5/1967 |
| WO | WO 00/12278 | 3/2000 |
| WO | WO 00/17413 | 3/2000 |

OTHER PUBLICATIONS

Elrod et al. (1989), "Nozzleless Droplet Formation with Focused Acoustic Beams," *J. Appl. Phys.* 65(9):3441–3447.

Hadimioglu et al. (1992), "Acoustic Ink Printing," *Ultrasonics Symposium*, pp. 929–935.

MacBeath et al. (2000), "Printing Proteins as Microarrays for High–Throughput Function Determination," *Science* 289:1760–1763.

Primary Examiner—Jan Ludlow
(74) Attorney, Agent, or Firm—Dianne E. Reed; Reed & Associates

(57) ABSTRACT

A method and device for generating droplets of immiscible fluids are provided. Extremely fine droplets may be generated, on the order of 1 picoliter or less, using focused acoustic energy to eject the droplets from a reservoir containing two or more immiscible fluids. Optionally, the droplets may be ejected onto discrete sites on a substrate surface so as to form an array thereon.

70 Claims, 1 Drawing Sheet

U.S. PATENT DOCUMENTS

| | | |
|---|---|---|
| 5,231,426 A | 7/1993 | Sweet |
| 5,339,101 A | 8/1994 | Rawson et al. |
| 5,377,902 A | 1/1995 | Hayes |
| 5,392,064 A | 2/1995 | Hadimioglu et al. |
| 5,415,679 A | 5/1995 | Wallace |
| 5,436,327 A | 7/1995 | Southern et al. |
| 5,498,444 A | 3/1996 | Hayes |
| 5,520,715 A | 5/1996 | Oeftering |
| 5,556,752 A | 9/1996 | Lockhart et al. |
| 5,591,490 A | 1/1997 | Quate |
| 5,608,433 A | 3/1997 | Quate |
| 5,629,724 A | 5/1997 | Elrod et al. |
| 5,631,678 A | 5/1997 | Hadimioglu et al. |
| 5,643,353 A | 7/1997 | Wallace et al. |
| 5,658,802 A | 8/1997 | Hayes et al. |
| 5,669,971 A | 9/1997 | Bok et al. |
| 5,722,479 A | 3/1998 | Oeftering |
| 5,744,305 A | 4/1998 | Fodor et al. |
| 5,798,779 A | 8/1998 | Nakayasu et al. |
| 5,808,636 A | 9/1998 | Stearns |
| 6,010,316 A | 1/2000 | Haller et al. |
| 6,015,880 A | 1/2000 | Baldeschwieler et al. |
| 6,028,189 A | 2/2000 | Blanchard |
| 6,029,896 A | 2/2000 | Self et al. |
| 6,110,426 A | 8/2000 | Shalon et al. |
| 6,377,387 B1 * | 4/2002 | Duthaler et al. ............ 359/296 |
| 2002/0037359 A1 | 3/2002 | Mutz et al. |
| 2002/0037579 A1 | 3/2002 | Ellson et al. |

* cited by examiner

FOCUSED ACOUSTIC ENERGY METHOD AND DEVICE FOR GENERATING DROPLETS OF IMMISCIBLE FLUIDS

CROSS-REFERENCE TO RELATED APPLICATIONS

This is a continuation-in-part of U.S. patent application Ser. No. 09/669,194, filed Sep. 25, 2000, now abandoned, the disclosure of which is incorporated by reference herein.

TECHNICAL FIELD

This invention relates generally to a method and device for generating fluid droplets, and more particularly relates to a method and device for generating droplets of immiscible fluids using focused acoustic ejection technology.

BACKGROUND

In many fields, it is often desirable to generate droplets of a fluid mixture composed of components that normally are immiscible with one another, wherein one or more of the components may be quite viscous. However, with prior methods for generating droplets of viscous fluids, control over droplet size is difficult. For example, conventional inkjet technologies such as piezoelectric and thermal inkjet printing are limited by the need to force a viscous material through a small nozzle. In order to dispense quantities of fluid on the order of 1 picoliter in volume, nozzle openings with dimensions of under 30 microns would be required. The energy required to move a viscous fluid out of such a small nozzle opening would be very high and would result in substantial shearing of the fluidic material. Nozzle clogging is also problematic with these printing technologies.

For a thermal inkjet printer, the ejection energy comes from the vaporization of the fluid to be printed. Most viscous fluids have an extremely high boiling point and would require significant thermal energy input. Piezoelectric printing might be a more efficient way of ejecting droplets of viscous material, but the thermal energy required would still be substantial. For example, U.S. Pat. No. 5,229,016 describes a method for dispensing solder with a piezoelectric ejection device. The system requires elevated temperature and a backpressure system of 30 psi in order to eject solder through a 25 µm orifice. Even with pressure assist, the maximum ejection rate for solder is on the order of 10 kHz. In U.S. Pat. No. 5,498,444, a method is described for ejecting polymers using a piezoelectric ejection device with the device operating at up to 40 cps along with elevated temperatures. The need for elevated temperatures, of course, reduces the number of materials one can work with, as heating many materials in order to reduce viscosity can result in degradation. Other devices for producing droplets of fluids, such as described, for example, in U.S. Pat. No. 4,812,856 to Wallace et al., are disadvantageous in other respects as well, including slow repetition rate due to refill time.

The use of acoustic energy in printing technology is known. For example, U.S. Pat. No. 4,308,547 to Lovelady et al. describes a liquid drop emitter that utilizes acoustic principles in ejecting liquid from a body of liquid onto a moving document for forming characters or bar codes thereon. Lovelady et al. is directed to a nozzleless inkjet printing apparatus wherein controlled drops of ink are propelled by an acoustical force produced by a curved transducer at or below the surface of the ink. In contrast to inkjet printing devices, nozzleless fluid ejection devices as described in the aforementioned patent are not subject to clogging and the disadvantages associated therewith, e.g., misdirected fluid or improperly sized droplets.

However, the development of nozzleless fluid ejection has generally been limited to ink printing applications. Since development of ink printing applications is strongly influenced by economic concerns, the bulk of the development efforts have been concentrated on reducing the cost of printing rather than on improving the quality of printing. In other words, development efforts for acoustic printing have focused on improving the speed of printing rather than accuracy. For example, U.S. Pat. No. 5,087,931 to Rawson is directed to a system for transporting ink under constant flow to an acoustic ink printer having a plurality of ejectors aligned in an axis, each ejector associated with a free surface of liquid ink. Having a plurality of ejectors generally increases printing speed. However, it is more difficult to control fluid ejection, specifically droplet placement, when a plurality of ejectors is used in place of a single ejector.

As another example, U.S. Pat. No. 4,797,693 to Quate describes an acoustic ink printer for printing polychromatic images on a recording medium. The printer is described as comprising a combination of a carrier containing a plurality of differently colored liquid inks, a single acoustic printhead acoustically coupled to the carrier for launching converging acoustic waves into the carrier, an ink transport means to position the carrier to sequentially bring the differently colored inks into alignment with the printhead, and a controller to modulate the radiation pressure exerted against the inks. It is disclosed that this type of printer is designed to allow the realization of cost saving. However, this device can eject only a limited quantity of ink from the carrier before the liquid surface moves out of acoustic focus and drop ejection ceases.

Thus, there is a need in the art for improved system that makes use of focused acoustic ejection technology to generate droplets of immiscible fluids without the disadvantages associated with photolithographic techniques, inkjet printing devices relying on a nozzle for droplet ejection, and prior acoustic ejection systems.

SUMMARY OF THE INVENTION

Accordingly, it is a primary object of the invention to address the aforementioned need in the art by providing a novel method and device for generating droplets of immiscible fluids using focused acoustic ejection technology.

It is another object of the invention to provide a method for generating a droplet of at least two immiscible fluids, wherein focused acoustic energy is applied to a reservoir containing the immiscible fluids in a manner effective to eject a droplet of fluid from the reservoir.

It is still another object of the invention to provide such a method wherein at least one of the immiscible fluids has a viscosity of at least about 10 cps.

It is yet another object of the invention to provide such a method wherein a first fluid is aqueous, a second fluid is nonaqueous, e.g., lipidic, and one of the two fluids contains a biomolecule or a pharmaceutical agent.

It is a further object of the invention to provide such a method wherein the reservoir is maintained at an elevated temperature, such that a first fluid in the reservoir comprises a liquid metal or a superconducting alloy and a second fluid comprises a wax or glass.

It is still a further object of the invention to provide such a method wherein the droplets containing the immiscible fluids are ejected onto localized regions within discrete sites on a substrate surface.

It is an additional object of the invention to provide a device for acoustically ejecting immiscible fluids from each of a plurality of fluid reservoirs, the device comprising an acoustic ejector constructed from an acoustic radiation generator and a focusing means, and a means for positioning the ejector in acoustic coupling relationship to each of the reservoirs.

Additional objects, advantages and novel features of the invention will be set forth in part in the description which follows, and in part will become apparent to those skilled in the art upon examination of the following, or may be learned by practice of the invention.

In one aspect, then, a method and device are provided for generating droplets of immiscible fluids using focused acoustic energy. The use of focused acoustic energy as implemented herein enables generation of extremely fine droplets, on the order of 1 picoliter or less, with extraordinarily accurate and repeatable droplet size and velocity. The method involves use of a device comprising: one or more reservoirs each containing two or more immiscible fluids; an ejector comprising an acoustic radiation generator for generating acoustic radiation and a focusing means for focusing the acoustic radiation generated; and a means for means positioning the ejector in acoustic coupling relationship to each of the reservoirs.

BRIEF DESCRIPTION OF THE DRAWINGS

FIG. 1 shows the acoustic ejector acoustically coupled to a first reservoir and having been activated in order to eject a droplet of fluid from within the reservoir toward a particular site on a substrate surface.

FIG. 2 shows the acoustic ejector acoustically coupled to a second reservoir.

DETAILED DESCRIPTION OF THE INVENTION

Figure 1:
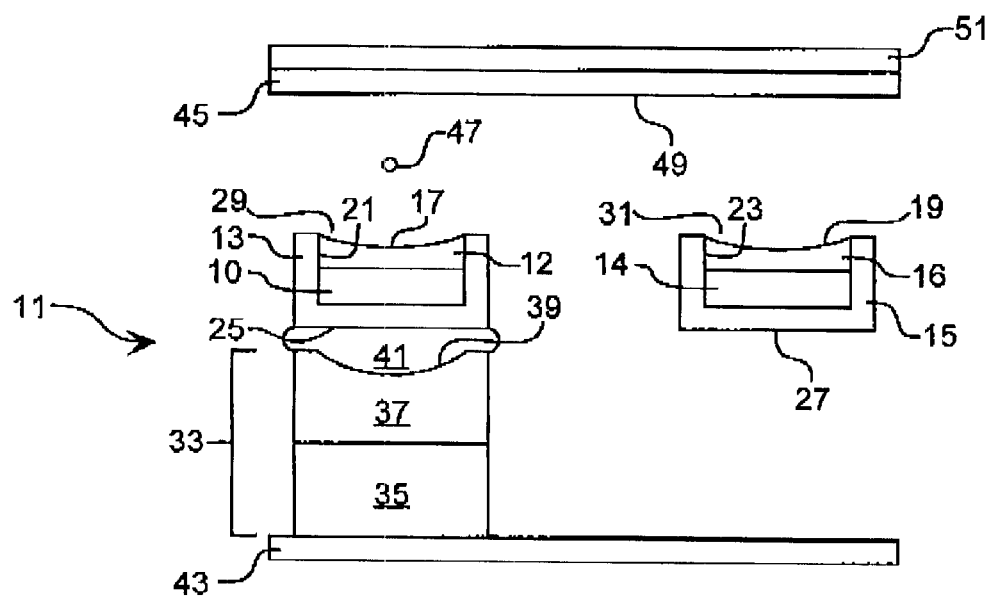
FIGS. 1 and 2 schematically illustrate in simplified cross-sectional view the operation of a focused acoustic ejection device in the preparation of oligonucleotide arrays.

Before describing the present invention in detail, it is to be understood that unless otherwise indicated this invention is not limited to specific fluids, acoustic ejection devices, substrates, or the like, as such may vary. It is also to be understood that the terminology used herein is for the purpose of describing particular embodiments only, and is not intended to be limiting.

It must be noted that, as used in this specification and the appended claims, the singular forms "a," "an" and "the" include plural referents unless the context clearly dictates otherwise. Thus, for example, the term "a fluid" is intended to mean a single fluid or a mixture of fluids, "a reservoir" is intended to mean one or more reservoirs, and the like.

In describing and claiming the present invention, the following terminology will be used in accordance with the definitions set out below.

The term "adsorb" as used herein refers to the noncovalent retention of a molecule by a substrate surface. That is, adsorption occurs as a result of noncovalent interaction between a substrate surface and adsorbing moieties present on the molecule that is adsorbed. Adsorption may occur through hydrogen bonding, van der Waal's forces, polar attraction or electrostatic forces (i.e., through ionic bonding). Examples of adsorbing moieties include, but are not limited to, amine groups, carboxylic acid moieties, hydroxyl groups, nitroso groups, sulfones and the like.

The terms "acoustic coupling" and "acoustically coupled" used herein refer to a state wherein an object is placed in direct or indirect contact with another object so as to allow acoustic radiation to be transferred between the objects without substantial loss of acoustic energy. When two items are indirectly acoustically coupled, an "acoustic coupling medium" is needed to provide an intermediary through which acoustic radiation may be transmitted. Thus, an ejector may be acoustically coupled to a fluid, e.g., by immersing the ejector in the fluid or by interposing an acoustic coupling medium between the ejector and the fluid to transfer acoustic radiation generated by the ejector through the acoustic coupling medium and into the fluid.

The term "attached," as in, for example, a substrate surface having an oligonucleotide "attached" thereto, includes covalent binding, adsorption, and physical immobilization. The terms "binding" and "bound" are identical in meaning to the term "attached."

The term "array" as used herein refers to a two-dimensional arrangement of features on a substrate surface. In the present arrays, the "features" are peptidic molecules. Arrays are generally comprised of regular, ordered features, as in, for example, a rectilinear grid, parallel stripes, spirals, and the like, but non-ordered arrays may be advantageously used as well. The arrays prepared using the method of the invention generally comprise in the range of about 4 to about 10,000,000 features, more typically about 4 to about 1,000,000 features.

The terms "biomolecule" and "biological molecule" are used interchangeably herein to refer to any organic molecule, whether naturally occurring, recombinantly produced, or chemically synthesized in whole or in part, that is, was or can be a part of a living organism. The terms encompass, for example, nucleotides, amino acids and monosaccharides, as well as oligomeric and polymeric species such as oligonucleotides and polynucleotides, peptidic molecules such as oligopeptides, polypeptides and proteins, saccharides such as disaccharides, oligosaccharides, polysaccharides, mucopolysaccharides or peptidoglycans (peptido-polysaccharides) and the like. The term also encompasses ribosomes, enzyme cofactors, pharmacologically active agents, and the like.

The term "fluid" as used herein refers to matter that is nonsolid or at least partially gaseous and/or liquid. A fluid may contain a solid that is minimally, partially or fully solvated, dispersed or suspended. Examples of fluids include, without limitation, aqueous liquids (including water per se and salt water) and nonaqueous liquids such as organic solvents, lipidic liquids, and the like. As used herein, the term "fluid" is not synonymous with the term "ink" in that an ink must contain a colorant and may not be gaseous.

The term "near" is used to refer to the distance from the focal point of the focused acoustic radiation to the surface of the fluid from which a droplet is to be ejected. The distance should be such that the focused acoustic radiation directed into the fluid results in droplet ejection from the fluid surface, and one of ordinary skill in the art will be able to select an appropriate distance for any given fluid using straightforward and routine experimentation. Generally, however, a suitable distance between the focal point of the acoustic radiation and the fluid surface is in the range of about 1 to about 15 times the wavelength of the speed of sound in the fluid, more typically in the range of about 1 to about 10 times that wavelength, preferably in the range of about 1 to about 5 times that wavelength.

The terms "focusing means" and "acoustic focusing means" as used herein refer to a means for causing acoustic waves to converge at a focal point by either a device separate from the acoustic energy source that acts like an optical lens, or by the spatial arrangement of acoustic energy sources to effect convergence of acoustic energy at a focal point by constructive and destructive interference. A focusing means may be as simple as a solid member having a curved surface, or it may include complex structures such as those found in Fresnel lenses, which employ diffraction in order to direct acoustic radiation. Suitable focusing means also include phased array methods as known in the art and described, for example, in U.S. Pat. No. 5,798,779 to Nakayasu et al. and Amemiya et al. (1997) *Proceedings of the 1997 IS&T NIP 13 International Conference on Digital Printing Technologies Proceedings*, at pp. 698-702.

The term "immiscible" is used in its conventional sense to refer to two fluids that are less than completely miscible, in that mixing two fluids that are "immiscible" results in a mixture containing more than one fluid phase. It is preferred that two "immiscible" fluids as provided herein are completely or almost completely immiscible, i.e., give rise to a mixture containing two phases wherein each phase contains at least about 95%, preferably at least about 99%, of a single fluid.

The term "reservoir" as used herein refers a receptacle or chamber for holding or containing a fluid. Thus, a fluid in a reservoir necessarily has a free surface, i.e., a surface that allows a droplet to be ejected therefrom.

The term "substrate" as used herein refers to any material having a surface onto which one or more fluids may be deposited. The substrate may be constructed in any of a number of forms such as wafers, slides, well plates, membranes, for example. In addition, the substrate may be porous or nonporous as may be required for deposition of a particular fluid. Suitable substrate materials include, but are not limited to, supports that are typically used for solid phase chemical synthesis, e.g., polymeric materials (e.g., polystyrene, polyvinyl acetate, polyvinyl chloride, polyvinyl pyrrolidone, polyacrylonitrile, polyacrylamide, polymethyl methacrylate, polytetrafluoroethylene, polyethylene, polypropylene, polyvinylidene fluoride, polycarbonate, divinylbenzene styrene-based polymers), agarose (e.g., Sepharose®), dextran (e.g., Sephadex®), cellulosic polymers and other polysaccharides, silica and silica-based materials, glass (particularly controlled pore glass, or "CPG") and functionalized glasses, ceramics, and such substrates treated with surface coatings, e.g., with microporous polymers (particularly cellulosic polymers such as nitrocellulose), microporous metallic compounds (particularly microporous aluminum), antibody-binding proteins (available from Pierce Chemical Co., Rockford Ill.), bisphenol A polycarbonate, or the like.

Substrates of particular interest are porous, and include, as alluded to above: uncoated porous glass slides, including CPG slides; porous glass slides coated with a polymeric coating, e.g., an aminosilane or poly-L-lysine coating, thus having a porous polymeric surface; and nonporous glass slides coated with a porous coating. The porous coating may be a porous polymer coating, such as may be comprised of a cellulosic polymer (e.g., nitrocellulose) or polyacrylamide, or a porous metallic coating (for example, comprised of microporous aluminum). Examples of commercially available substrates having porous surfaces include the Fluorescent Array Surface Technology (FAST™) slides available from Schleicher & Schuell, Inc. (Keene, N.H.), which are coated with a 10-30 μm thick porous, fluid-permeable nitrocellulose layer that substantially increases the available binding area per unit area of surface. Other commercially available porous substrates include the CREATIVECHIP® permeable slides currently available from Eppendorf AG (Hamburg, Germany), and substrates having "three-dimensional" geometry, by virtue of an ordered, highly porous structure that enables reagents to flow into and penetrate through the pores and channels of the entire structure. Such substrates are available from Gene Logic, Inc. under the tradename "Flow-Thru Chip," and are described by Steel et al. in Chapter 5 of *Microarray Biochip Technology* (BioTechniques Books, Natick, Mass., 2000).

The term "porous" as in a "porous substrate" or a "substrate having a porous surface," refers to a substrate or surface, respectively, having a porosity (void percentage) in the range of about 1% to about 99%, preferably about 5% to about 99%, more preferably in the range of about 15% to about 95%, and an average pore size of about 100 Å to about 1 mm, typically about 500 Å to about 0.5 mm.

The term "impermeable" is used in the conventional sense to mean not permitting water or other fluid to pass through. The term "permeable" as used herein means not "impermeable." Thus, a "permeable substrate" and a "substrate having a permeable surface" refer to a substrate or surface, respectively, which can be permeated with water or other fluid.

While the foregoing support materials are representative of conventionally used substrates, it is to be understood that a substrate may in fact comprise any biological, nonbiological, organic and/or inorganic material, and may be in any of a variety of physical forms, e.g., particles, strands, precipitates, gels, sheets, tubing, spheres, containers, capillaries, pads, slices, films, plates, and the like, and may further have any desired shape, such as a disc, square, sphere, circle, etc. The substrate surface may or may not be flat, e.g., the surface may contain raised or depressed regions. A substrate may additionally contain or be derivatized to contain reactive functionalities that covalently link a compound to the substrate surface. These are widely known and include, for example, silicon dioxide supports containing reactive Si—OH groups, polyacrylamide supports, polystyrene supports, polyethylene glycol supports, and the like.

The term "surface modification" as used herein refers to the chemical and/or physical alteration of a surface by an additive or subtractive process to change one or more chemical and/or physical properties of a substrate surface or a selected site or region of a substrate surface. For example, surface modification may involve (1) changing the wetting properties of a surface, (2) functionalizing a surface, i.e., providing, modifying or substituting surface functional groups, (3) defunctionalizing a surface, i.e., removing surface functional groups, (4) otherwise altering the chemical composition of a surface, e.g., through etching, (5) increasing or decreasing surface roughness, (6) providing a coating on a surface, e.g., a coating that exhibits wetting properties that are different from the wetting properties of the surface, and/or (7) depositing particulates on a surface.

"Optional" or "optionally" means that the subsequently described circumstance may or may not occur, so that the description includes instances where the circumstance occurs and instances where it does not.

The term "substantially" as in, for example, the phrase "substantially all molecules of an array," refers to at least 90%, preferably at least 95%, more preferably at least 99%, and most preferably at least 99.9%, of the molecules of an array. Other uses of the term "substantially" involve an analogous definition.

The invention accordingly provides a method and device for generating droplets of immiscible fluids using focused acoustic energy as described in detail in co-pending patent application U.S. Ser. No. 09/669,996 ("Acoustic Ejection of Fluids From a Plurality of Reservoirs"), inventors Ellson, Foote and Mutz, filed Sep. 25, 2000, now abandoned, and assigned to Picoliter, Inc. (Mountain View, Calif.). As explained in the aforementioned patent application, focused acoustic energy may be used to eject single fluid droplets from the free surface of a fluid (e.g., in a reservoir or well plate), optionally onto a substrate surface (such as in the preparation of arrays, in which each droplet is deposited at a discrete site within the array), enabling extraordinarily accurate and repeatable droplet size and velocity. The device used comprises: one or more reservoirs each containing two or more immiscible fluids; an ejector comprising an acoustic radiation generator for generating acoustic radiation and a focusing means for focusing acoustic radiation at a focal point sufficiently near the fluid surface in each of the reservoirs so as to result in droplet ejection; and a means for means positioning the ejector in acoustic coupling relationship to each of the reservoirs. Preferably, none of the fluids is an ink.

FIG. 1 illustrates a suitable focused acoustic ejection device in simplified cross-sectional view. As with all figures referenced herein, in which like parts are referenced by like numerals, FIG. 1 is not to scale, and certain dimensions may be exaggerated for clarity of presentation. The device 11 generally although not necessarily includes a plurality of reservoirs, i.e., at least two reservoirs. For simplicity, the device is illustrated as containing two reservoirs, with a first reservoir indicated at 13 and a second reservoir indicated at 15; however, it is to be understood that a device containing a single reservoir or three or more reservoirs may be employed. Each reservoir contains a combination of two or more immiscible fluids, and the individual fluids as well as the fluid combinations in the different reservoirs may be the same or different. Reservoirs containing a two-phase system are illustrated in the figure, with reservoir 13 containing a lower fluid layer 10 and an upper fluid layer 12, and reservoir 15 containing a lower fluid layer 14 and an upper fluid layer 16. It must be emphasized, however, that the two-phase system is illustrated and described merely for simplicity, and as each reservoir may contain three or more immiscible fluids, the invention is not limited in this regard. Upper fluid layers 12 and 16 have fluid surfaces respectively indicated at 17 and 19. As shown, the reservoirs are of substantially identical construction so as to be substantially acoustically indistinguishable, but identical construction is not a requirement. The reservoirs are shown as separate removable components but may, if desired, be fixed within a plate or other substrate. For example, the plurality of reservoirs may comprise individual wells in a well plate, optimally although not necessarily arranged in an array. Each of the reservoirs 13 and 15 is preferably axially symmetric as shown, having vertical walls 21 and 23 extending upward from circular reservoir bases 25 and 27 and terminating at openings 29 and 31, respectively, although other reservoir shapes may be used. The material and thickness of each reservoir base should be such that acoustic radiation may be transmitted therethrough and into the fluid contained within the reservoirs.

The device also includes an acoustic ejector 33 comprised of an acoustic radiation generator 35 for generating acoustic radiation and a focusing means 37 for focusing the acoustic radiation at a focal point near the fluid surface from which a droplet is to be ejected, wherein the focal point is selected so as to result in droplet ejection. The focal point may be in the upper fluid layer or the lower fluid layer, but is preferably just below the interface therebetween. As shown in FIG. 1, the focusing means 37 may comprise a single solid piece having a concave surface 39 for focusing acoustic radiation, but the focusing means may be constructed in other ways as discussed below. The acoustic ejector 33 is thus adapted to generate and focus acoustic radiation so as to eject a droplet of fluid from each of the fluid surfaces 17 and 19 when acoustically coupled to reservoirs 13 and 15, respectively. The acoustic radiation generator 35 and the focusing means 37 may function as a single unit controlled by a single controller, or they may be independently controlled, depending on the desired performance of the device. Typically, single ejector designs are preferred over multiple ejector designs because accuracy of droplet placement and consistency in droplet size and velocity are more easily achieved with a single ejector.

As will be appreciated by those skilled in the art, any of a variety of focusing means may be employed in conjunction with the present invention. For example, one or more curved surfaces may be used to direct acoustic radiation to a focal point near a fluid surface. One such technique is described in U.S. Pat. No. 4,308,547 to Lovelady et al. Focusing means with a curved surface have been incorporated into the construction of commercially available acoustic transducers such as those manufactured by Panametrics Inc. (Waltham, Mass.). In addition, Fresnel lenses are known in the art for directing acoustic energy at a predetermined focal distance from an object plane. See, e.g., U.S. Pat. No. 5,041,849 to Quate et al. Fresnel lenses may have a radial phase profile that diffracts a substantial portion of acoustic energy into a predetermined diffraction order at diffraction angles that vary radially with respect to the lens. The diffraction angles should be selected to focus the acoustic energy within the diffraction order on a desired object plane.

There are also a number of ways to acoustically couple the ejector 33 to each individual reservoir and thus to the fluid therein. One such approach is through direct contact as is described, for example, in U.S. Pat. No. 4,308,547 to Lovelady et al., wherein a focusing means constructed from a hemispherical crystal having segmented electrodes is submerged in a liquid to be ejected. The aforementioned patent further discloses that the focusing means may be positioned at or below the surface of the liquid. However, this approach for acoustically coupling the focusing means to a fluid is undesirable when the ejector is used to eject different fluids in a plurality of containers or reservoirs, as repeated cleaning of the focusing means would be required in order to avoid cross-contamination. The cleaning process would necessarily lengthen the transition time between each droplet ejection event. In addition, in such a method, fluid would adhere to the ejector as it is removed from each container, wasting material that may be costly or rare.

Thus, a preferred approach is to acoustically couple the ejector to the reservoirs and reservoir fluids without contacting any portion of the ejector, e.g., the focusing means, with any of the fluids to be ejected. To this end, the present invention provides an ejector positioning means for positioning the ejector in controlled and repeatable acoustic coupling with each of the fluids in the reservoirs to eject droplets therefrom without submerging the ejector therein. This typically involves direct or indirect contact between the ejector and the external surface of each reservoir. When direct contact is used in order to acoustically couple the ejector to each reservoir, it is preferred that the direct contact is wholly conformal to ensure efficient acoustic energy transfer. That is, the ejector and the reservoir should have corresponding surfaces adapted for mating contact. Thus, if acoustic coupling is achieved between the ejector and reservoir through the focusing means, it is desirable for the reservoir to have an outside surface that corresponds to the surface profile of the focusing means. Without conformal contact, efficiency and accuracy of acoustic energy transfer may be compromised. In addition, since many focusing means have a curved surface, the direct contact approach may necessitate the use of reservoirs having a specially formed inverse surface.

Optimally, acoustic coupling is achieved between the ejector and each of the reservoirs through indirect contact, as illustrated in FIG. 1. In the figure, an acoustic coupling medium 41 is placed between the ejector 33 and the base 25 of reservoir 13, with the ejector and reservoir located at a predetermined distance from each other. The acoustic coupling medium may be an acoustic coupling fluid, preferably an acoustically homogeneous material in conformal contact with both the acoustic focusing means 37 and each reservoir. In addition, it is important to ensure that the fluid medium is substantially free of material having different acoustic properties than the fluid medium itself. As shown, the first reservoir 13 is acoustically coupled to the acoustic focusing means 37 such that an acoustic wave is generated by the acoustic radiation generator and directed by the focusing means 37 into the acoustic coupling medium 41, which then transmits the acoustic radiation into the reservoir 13.

In operation, each reservoir 13 and 15 of the device is filled with a combination of two or more immiscible fluids, as explained above. The acoustic ejector 33 is positionable by means of ejector positioning means 43, shown below reservoir 13, in order to achieve acoustic coupling between the ejector and the reservoir through acoustic coupling medium 41. If droplet ejection onto a substrate is desired, a substrate 45 may be positioned above and in proximity to the first reservoir 13 such that one surface of the substrate, shown in FIG. 1 as underside surface 51, faces the reservoir and is substantially parallel to the surface 17 of the fluid 14 therein. Once the ejector, the reservoir and the substrate are in proper alignment, the acoustic radiation generator 35 is activated to produce acoustic radiation that is directed by the focusing means 37 to a focal point near the fluid surface 17 of the first reservoir. As a result, droplet 47 is ejected from the fluid surface 17, optionally onto a particular site (typically although not necessarily, a pre-selected, or "predetermined" site) on the underside surface 49 of the substrate. The ejected droplet may be retained on the substrate surface by solidifying thereon after contact; in such an embodiment, it is necessary to maintain the substrate surface at a low temperature, i.e., at a temperature that results in droplet solidification after contact. Alternatively, or in addition, a molecular moiety within the droplet attaches to the substrate surface after contact, through adsorption, physical immobilization, or covalent binding.

Figure 2:
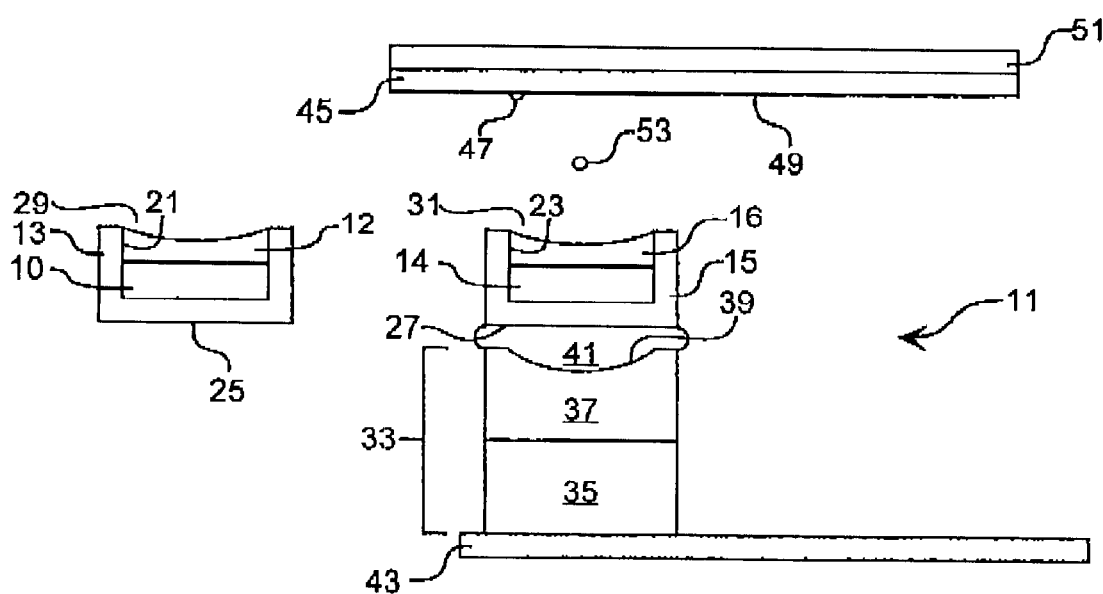

Then, as shown in FIG. 2, a substrate positioning means 51 may be used to reposition the substrate 45, if used, over reservoir 15 in order to receive a droplet therefrom at a second site. FIG. 2 also shows that the ejector 33 has been repositioned by the ejector positioning means 43 below reservoir 15 and in acoustically coupled relationship thereto by virtue of acoustic coupling medium 41. Once properly aligned as shown in FIG. 2, the acoustic radiation generator 35 of ejector 33 is activated to produce acoustic radiation that is then directed by focusing means 37 to a focal point within the reservoir fluids in reservoir 15, thereby ejecting droplet 53, optionally onto the substrate. It should be evident that such operation is illustrative of how the inventive device may be used to eject a plurality of immiscible fluids from reservoirs in order to form a pattern, e.g., an array, on the substrate surface 49. It should be similarly evident that the device may be adapted to eject a plurality of droplets from one or more reservoirs onto the same site of the substrate surface.

As discussed above, either individual, e.g., removable, reservoirs or well plates may be used to contain combinations of immiscible fluids that are to be ejected, wherein the reservoirs or the wells of the well plate are preferably substantially acoustically indistinguishable from one another. Also, unless it is intended that the ejector be submerged in the fluids to be ejected, the reservoirs or well plates must have acoustic transmission properties sufficient to allow acoustic radiation from the ejector to be conveyed to the surfaces of the fluids to be ejected. Typically, this involves providing reservoir or well bases that are sufficiently thin to allow acoustic radiation to travel therethrough without unacceptable dissipation, In addition, the material used in the construction of reservoirs must be compatible with the fluids contained therein. Thus, if it is intended that the reservoirs or wells contain a particular organic solvent, polymers that dissolve or swell in that solvent would be unsuitable for use in forming the reservoirs or well plates. For water-based fluids, a number of materials are suitable for the construction of reservoirs and include, but are not limited to, ceramics such as silicon oxide and aluminum oxide, metals such as stainless steel and platinum, and polymers such as polyester and polytetrafluoroethylene. Many well plates are commercially available and may contain, for example, 96, 384 or 1536 wells per well plate. Manufactures of suitable well plates for use in the inventive device include Corning Inc. (Corning, N.Y.) and Greiner America, Inc. (Lake Mary, Fla.). However, the availability of such commercially available well plates does not preclude manufacture and use of custom-made well plates containing at least about 10,000 wells, or as many as 100,000 wells or more. For array forming applications, it is expected that about 100,000 to about 4,000,000 reservoirs may be employed. In addition, to reduce the amount of movement needed to align the ejector with each reservoir or well, it is preferable that the center of each reservoir is located not more than about 1 centimeter, preferably not more than about 1 millimeter and optimally not more than about 0.5 millimeter from a neighboring reservoir center.

From the above, it is evident that various components of the device may require individual control or synchronization to form an array on a substrate. For example, the ejector positioning means may be adapted to eject droplets from each reservoir in a predetermined sequence associated with an array to be prepared on a substrate surface. Similarly, the substrate positioning means for positioning the substrate surface with respect to the ejector may be adapted to position the substrate surface to receive droplets in a pattern or array thereon. Either or both positioning means, i.e., the ejector positioning means and the substrate positioning means, may be constructed from, for example, motors, levers, pulleys, gears, a combination thereof, or other electromechanical or mechanical means known to one of ordinary skill in the art. It is preferable to ensure that there is a correspondence between the movement of the substrate, the movement of the ejector, and the activation of the ejector to ensure proper pattern formation.

The device may also include certain performance-enhancing features. For example, the device may include a cooling means for lowering the temperature of the substrate surface to ensure, for example, that the ejected droplets adhere to the substrate. The cooling means may be adapted to maintain the substrate surface at a temperature that allows fluid to partially or preferably substantially solidify after the fluid comes into contact therewith. The device may also include a means for maintaining fluid in the reservoirs at a constant temperature, since repeated application of acoustic energy to a fluid will result in heating, which can in turn cause unwanted changes in fluid properties such as viscosity, surface tension and density. Design and construction of such temperature maintaining means are known to one of ordinary skill in the art and will involve incorporation of at least one heating element and/or at least one cooling element. For many biomolecular applications, it is generally desired that the fluid containing the biomolecule be kept at a constant temperature without deviating more than about 1° C. or 2° C. therefrom. In addition, for a biomolecular fluid that is particularly heat sensitive, it is preferred that the fluid be kept at a temperature that does not exceed about 10° C. above the melting point of the fluid, preferably at a temperature that does not exceed about 5° C. above the melting point of the fluid. Thus, for example, when the biomolecule-containing fluid is aqueous, it may be optimal to keep the fluid at about 4° C. during ejection.

In some cases, a substrate surface may be modified prior to acoustic deposition of fluids thereon. Surface modification may involve functionalization or defunctionalization, smoothing or roughening, coating, degradation or otherwise altering the surface's chemical composition or physical properties. A preferred surface modification method involves altering the wetting properties of the surface, for example to facilitate confinement of a droplet ejected on the surface within a designated area or enhancement of the kinetics for the surface attachment of molecular moieties contained in the ejected droplet. A preferred method for altering the wetting properties of the substrate surface involves deposition of droplets of a suitable surface modification fluid at each site of the substrate surface to which an array element will attach, prior to acoustic ejection of fluids to form an array thereon. In this way, the "spread" of the acoustically ejected droplets may be optimized and consistency in spot size (i.e., diameter, height and overall shape) ensured. One way to implement the method involves acoustically coupling the ejector to a modifier reservoir containing a surface modification fluid and then activating the ejector, as described in detail above, to produce and eject a droplet of surface modification fluid toward a particular site on the substrate surface. The method is repeated as desired to deposit surface modification fluid at additional surface sites.

The aforementioned focused acoustic energy system enables ejection of droplets at a rate of at least about 1,000,000 droplets per minute from the same reservoir, and at a rate of at least about 100,000 drops per minute from different reservoirs. In addition, current positioning technology allows for the ejector positioning means to move from one reservoir to another quickly and in a controlled manner, thereby allowing fast and controlled ejection of different fluids. That is, current commercially available technology allows the ejector to be moved from one reservoir to another, with repeatable and controlled acoustic coupling at each reservoir, in less than about 0.1 second for high performance positioning means and in less than about 1 second for ordinary positioning means. A custom designed system will allow the ejector to be moved from one reservoir to another with repeatable and controlled acoustic coupling in less than about 0.001 second. In order to provide a custom designed system, it is important to keep in mind that there are two basic kinds of motion: pulse and continuous. Pulse motion involves the discrete steps of moving an ejector into position, emitting acoustic energy, and moving the ejector to the next position; again, using a high performance positioning means with such a method allows repeatable and controlled acoustic coupling at each reservoir in less than 0.1 second. A continuous motion design, on the other hand, moves the ejector and the reservoirs continuously, although not at the same speed, and provides for ejection during movement. Since the pulse width is very short, this type of process enables over 10 Hz reservoir transitions, and even over 1000 Hz reservoir transitions.

In order to ensure the accuracy of fluid ejection, it is important to determine the location and the orientation of the fluid surface from which a droplet is to be ejected with respect to the ejector. Otherwise, ejected droplets may be improperly sized or travel in an improper trajectory. Thus, another embodiment of the invention relates to a method for determining the height of a fluid surface or fluid layers in a reservoir between ejection events. The method involves acoustically coupling a fluid-containing reservoir to an acoustic radiation generator and activating the generator to produce a detection acoustic wave that travels to the fluid surface and is reflected thereby as a reflected acoustic wave. Parameters of the reflected acoustic radiation are then analyzed in order to assess the spatial relationship between the acoustic radiation generator and the fluid surface. Such an analysis will involve the determination of the distance between the acoustic radiation generator and the fluid surface and/or the orientation of the fluid surface in relationship to the acoustic radiation generator.

More particularly, the acoustic radiation generator may be activated so as to generate low energy acoustic radiation that is insufficiently energetic to eject a droplet from the fluid surface. This is typically done by using an extremely short pulse (on the order of tens of nanoseconds) relative to that normally required for droplet ejection (on the order of microseconds). By determining the time it takes for the acoustic radiation to be reflected by the fluid surface back to the acoustic radiation generator and then correlating that time with the speed of sound in the fluid, the distance B and thus the fluid height—may be calculated. Of course, care must be taken in order to ensure that acoustic radiation reflected by the interface between the reservoir base and the fluid is discounted. It will be appreciated by those of ordinary skill in the art of acoustic microscopy that such a method employs conventional or modified sonar techniques.

Once the analysis has been performed, an ejection acoustic wave having a focal point near the fluid surface is generated in order to eject at least one droplet of the fluid, wherein the optimum intensity and directionality of the ejection acoustic wave is determined using the aforementioned analysis optionally in combination with additional data. The "optimum" intensity and directionality are generally selected to produce droplets of consistent size and velocity. For example, the desired intensity and directionality of the ejection acoustic wave may be determined by using not only the spatial relationship assessed as above, but also geometric data associated with the reservoir, fluid property data associated with the fluid to be ejected, and/or by using historical droplet ejection data associated with the ejection sequence. In addition, the data may show the need to reposition the ejector so as to reposition the acoustic radiation generator with respect to the fluid surface, in order to ensure that the focal point of the ejection acoustic wave is near the fluid surface, where desired. For example, if analysis reveals that the acoustic radiation generator is positioned such that the ejection acoustic wave cannot be focused near the fluid surface, the acoustic radiation generator is repositioned using vertical, horizontal and/or rotational movement to allow appropriate focusing of the ejection acoustic wave.

When the present process and device are used to prepare an array on a substrate surface, the properties of the array constituents are generally screened in a manner appropriate to the particular array. Screening for material properties may be effected by measuring physical and chemical properties, including by way of example rather than limitation, measuring the chemical, mechanical, optical, thermal, electrical or electronic, by routine methods easily adaptable to microarrays. In addition to bulk material characteristics or properties, surface specific properties may be measured by surface specific physical techniques and physical techniques that are adapted to surface characterization. Macroscopic surface phenomena including adsorption, catalysis, surface reactions including oxidation, hardness, lubrication and friction, may be examined on a molecular scale using such characterization techniques. Various physical surface characterization techniques include without limitation diffractive techniques, spectroscopic techniques, microscopic surface imaging techniques, surface ionization mass spectroscopic techniques, thermal desorption techniques and ellipsometry. It should be appreciated that these classifications are arbitrary made for purposes of explication, and some overlap may exist.

The aforementioned device and method may be adapted to eject fluids of virtually any type and amount desired, and deposition on a substrate is optional. That is, in many cases, it may be desirable to generate droplets of immiscible fluids wherein, for example, one fluid encapsulates another, and further wherein the droplets are useful per se without attachment to a substrate. For example, a first fluid may encapsulate a second fluid containing a biomolecule, e.g., a lipidic phase may encapsulate an aqueous fluid containing a pharmaceutical agent or other biologically active material. Furthermore, because of the precision that is possible using the inventive technology, the device may be used to eject droplets from a reservoir adapted to contain no more than about 100 nanoliters of fluid, preferably no more than 10 nanoliters of fluid. In certain cases, the ejector may be adapted to eject a droplet from a reservoir adapted to contain about 1 to about 100 nanoliters of fluid. This is particularly useful when the fluid to be ejected contains rare or expensive biomolecules, wherein it may be desirable to eject droplets having a volume of about 1 picoliter or less, e.g., having a volume in the range of about 0.25 pL to about 1 pL.

With respect to the immiscible fluids, any one reservoir and thus any one droplet may contain two or more immiscible fluids, although often only two immiscible fluids are present. The immiscible fluids may have different viscosities, and one or more of the fluids may have a fairly high viscosity, e.g., at least about 10 cps, possibly at least about 100 cps. In one embodiment, for example, one of the fluids in a single reservoir may have a viscosity in the range of approximately 10 cps to approximately 10,000 cps and another of the fluids therein may have a viscosity of less than about 0.3 cps. In order to encapsulate a first fluid within a second, the lower layer should comprise the first fluid, and the upper layer should comprise the second, encapsulating fluid, wherein the thickness of the upper layer is preferably less than about 10% of the thickness of the lower layer, more preferably less than about 5% of the thickness of the lower layer, and typically in the range of about 0.1% to 5% of the thickness of the lower layer. However, the upper layer may, in some cases, comprise a molecular bilayer or even a molecular monolayer, e.g., when a very thin encapsulating "coating" is desired.

In a typical case, one of the immiscible fluids in a reservoir is aqueous and another of the immiscible fluids is nonaqueous. Aqueous fluids include water per se as well as aqueous solutions, dispersions and suspensions of various nonfluidic materials. Nonaqueous fluids may be, for example, organic solvents, lipidic materials, or the like. Examples of organic solvents include, without limitation: hydrocarbons, including aliphatic alkanes such as hexane, heptane, octane, etc., cyclic alkanes such as cyclohexane, and aromatic hydrocarbons such as benzene, cumene, pseudocumene, cymene, styrene, toluene, xylenes, tetrahydronaphthalene and mesitylene; halogenated compounds such as carbon tetrachloride and chlorinated, fluorinated and brominated hydrocarbons such as chloroform, bromoform, methyl chloroform, chlorobenzene, o-dichlorobenzene, chloroethane, 1,1-dichloroethane, tetrachloroethanes, epichlorohydrin, trichloroethylene and tetrachloroethylene; ethers such as diethyl ether, diisopropyl ether, diisobutyl ether, 1,4-dioxane, 1,3-dioxolane, dimethoxymethane, furan and tetrahydrofuran; aldehydes such as methyl formate, ethyl formate and furfural; ketones such as acetone, diisobutyl ketone, cyclohexanone, methyl ethyl ketone, N-methyl-2-pyrrolidone and isophorone; amides such as dimethyl formamide and dimethyl acetamide; alcohols such as ethanol, isopropanol, t-butyl alcohol, cyclohexanol, glycerol, ethylene glycol and propylene glycol; amines, including cyclic amines such as pyridine, piperidine, 2-methylpyridine, morpholine, etc., and mono-, di- and tri-substituted amines such as trimethylamine, dimethylamine, methylamine, triethylamine, diethylamine, ethylamine, n-butylamine, t-butylamine, triethanolamine, diethanolamine and ethanolamine, and amine-substituted hydrocarbons such as ethylene diamine, diethylene triamine; carboxylic acids such as acetic acid, trifluoroacetic acid and formic acid; esters such as ethyl acetate, isopentyl acetate, propylacetate, etc.; lactams such as caprolactam; nitriles such as acetonitrile, propane nitrile and adiponitrile; organic nitrates such as nitrobenzene, nitroethane and nitromethane; and sulfides such as carbon disulfide.

Examples of lipidic materials include, but are not limited to, the following: phospholipids such as phosphorylated diacyl glycerides, and particularly phospholipids selected from the group consisting of diacyl phosphatidylcholines, diacyl phosphatidylethanolamines, diacyl phosphatidylserines, diacyl phosphatidylinositols, diacyl phosphatidylglycerols, diacyl phosphatidic acids, and mixtures thereof, wherein each acyl group contains about 10 to about 22 carbon atoms and is saturated or unsaturated; fatty acids such as isovaleric acid, valeric acid, caproic acid, enanthic acid, caprylic acid, pelargonic acid, capric acid, lauric acid, myristic acid, palmitic acid, stearic acid, arachidic acid, behenic acid, lignoceric acid, oleic acid, linoleic acid, linolenic acid, and arachidonic acid; lower fatty acid esters comprising esters of the foregoing fatty acids, wherein the carboxylic acid group of the fatty acid is replaced with an ester moiety —(CO)—OR wherein R is a $C_1$-$C_3$ alkyl moiety optionally substituted with one or two hydroxyl groups; fatty alcohols corresponding to the aforementioned fatty acids, wherein the carboxylic acid group of the fatty acid is replaced by a —$CH_2OH$ group; glycolipids such as cerebroside and gangliosides; oils, including animal oils such as cod liver oil and, menhaden oil, and vegetable oils such as babassu oil, castor oil, corn oil, cotton seed oil, linseed oil, mustard oil, olive oil, palm oil, palm kernel oil, peanut oil, poppyseed oil, rapeseed oil, safflower oil, sesame oil, soybean oil, sunflower seed oil, tung oil or wheat germ oil; and waxes, i.e., higher fatty acid esters, including animal waxes such as beeswax and shellac, mineral waxes such as montan, petroleum waxes such as microcrystalline wax and paraffin, and vegetable waxes such as carnauba wax.

In pharmaceutical and biotechnology applications, one of the two phases may contain a biomolecule, e.g., a molecular moiety selected from the group consisting of DNA, RNA, antisense oligonucleotides, peptides, proteins (including fluorescent proteins), ribosomes and enzyme cofactors such as biotin. The biomolecule may also be a pharmaceutical agent such as may be, for example, selected from the following groups: analgesic agents; anesthetic agents; anti-arthritic agents; respiratory drugs, including antiasthamatic agents; anticancer agents, including antineoplastic drugs; anticholinergics; anticonvulsants; antidepressants; antidiabetic agents; antidiarrheals; antihelminthics; antihistamines; antihyperlipidemic agents; antihypertensive agents; anti-infective agents such as antibiotics and antiviral agents; antiinflammatory agents; antimigraine preparations; antinauseants; antineoplastic agents; antiparkinsonism drugs; antipruritics; antipsychotics; antipyretics; antispasmodics; antitubercular agents; antiulcer agents; antiviral agents; anxiolytics; appetite suppressants; attention deficid disorder (ADD) and attention deficit hyperactivity disorder (ADHD) drugs; cardiovascular preparations including calcium channel blockers, CNS agents; beta-blockers and antiarrhythmic agents; central nervous system stimulants; cough and cold preparations, including decongestants; diuretics; genetic materials; herbal remedies; homonolytics; hypnotics; hypoglycemic agents; immunosupperessive agents; leukotriene inhibitors; miotic inhibitors; muscle relaxants; narcotic antagonists; nicotine; nutritional agents, such as vitamins, essential amino acids and fatty acids; ophthalmic drugs such as antiglaucoma agents; parasympatholytics; peptide drugs; psychostimulants; sedatives; steroids; sympathomimetics; tranquilizers; and vasodilators including general coronary, peripheral and cerebral.

The invention is not limited, however, with respect to a combination of an aqueous fluid and a nonaqueous fluid. It must be emphasized that the method and device of the invention can be used with an unlimited number of immiscible fluids, including fluids that have a very high melting temperature, e.g., metals, alloys and glasses. The capability of producing fine droplets of such materials is in sharp contrast to piezoelectric technology, insofar as piezoelectric systems perform suboptimally at elevated temperatures. The present method enables the acoustic radiation generator to be removed from the high temperature fluid (e.g., a liquid metal) and for the acoustic coupling medium to provide a thermal buffer or cooling. A cooling jacket may also be used, as described, for example, in U.S. Pat. Nos. 5,520,715 and 5,722,479 to Oeftering.

Accordingly, one of the immiscible fluids may be a liquid metal, including, but not limited to, a metal selected from the group consisting of mercury, aluminum, solder, gold, silver, plutonium, americium, mixtures thereof, and superconducting alloys. A second immiscible fluid ejected with a liquid metal, might be, for example, a wax, a ceramic material, a precursor to a ceramic material, an amorphous material, or a precursor to a ceramic material. Coating a metal droplet (e.g., mercury) with a material such as a wax (e.g., beeswax or paraffin) would advantageously keep the metal isolated from oxygen when in flight to prevent oxidation. Another application involves coating glass beads with a thin metal layer, e.g., to form a retro-reflector. This would involve ejecting a droplet containing a combination of a liquid metal and a liquid glass. Still another application involves using the present droplet ejection technology to encase toxic compounds in glass or other materials to make such compounds safer for processing. A variation of this application involves encasing a radioactive compound in a material that is transparent to the emitted radiation. For example, an alpha emitter such as plutonium or americium may be encased in a layer of a material that is transparent to alpha particles, i.e., a very thin, porous layer that may comprise, for example, porous glass or a porous polymeric material.

It is to be understood that while the invention has been described in conjunction with the preferred specific embodiments thereof, the foregoing description is intended to illustrate and not limit the scope of the invention. Other aspects, advantages and modifications will be apparent to those skilled in the art to which the invention pertains.

All patents, patent applications, journal articles and other references cited herein are incorporated by reference in their entireties.

The following example is put forth so as to provide those of ordinary skill in the art with a complete disclosure and description of how to implement the invention, and is not intended to limit the scope of what the inventors regard as their invention.

EXAMPLE

This example demonstrates the use of focused acoustic ejection technology in generating droplets of immiscible fluids. Aqueous fluid containing a dye was ejected through an immiscible layer of mineral oil, and ejection was performed with an F=3 lens with a 6 mm aperture and a nominal 18 mm focal length in water. Water was used as a coupling fluid to conduct acoustic energy from the lens to the bottom of a Greiner 387 polystyrene well plate with a number of the wells containing 36 $\mu$L of aqueous solution.

Accordingly, an aqueous solution was prepared containing 5 $\mu$g/ml cyanine-5 dye (Pharmacia) and a 4x concentration of sodium citrate buffer (4x SCC), pH=7.0. Blue food coloring was also added to help visualize the ejected drops. After preparation of the aqueous solution, 1 $\mu$L, 2 $\mu$L and 4 $\mu$L of white mineral oil (Rite-Aid) was pipetted onto the aqueous fluid contained in three individual wells in the well plate, to provide a lipidic layer on the aqueous solution. The lipidic layers ranged from about 2.7% to 11% of the total well depth.

RF energy delivered to the transducer was 30 MHz and delivered with a peak-to-peak amplitude of 150 V for 65 microseconds. The distance of the transducer to the well plate was adjusted to maintain the focal point of the acoustic energy within the aqueous layer but near enough to the aqueous/oil interface to achieve ejection. Stable droplet ejection was observed in all three cases, i.e., the size, velocity, and direction of all ejected droplets were consistent. For purposes of comparison, droplets of water and mineral oil were ejected under the same conditions. The droplet sizes for the aqueous fluid covered with oil were similar to droplet sizes for aqueous fluid not covered with oil. The average size of the deposited water-only spots was approximately 120 microns in diameter when ejected onto a porous surface, i.e., onto nitrocellulose-coated glass slides (FAST™ slides from Schleicher and Schuell, Inc., Keene, N.H.). Droplets formed from the water/oil reservoirs were of similar size and formed spots of similar size as well.

The experiment was repeated using dimethyl sulfoxide (DMSO) instead of the 4x SSC. Again, droplet ejection was stable and the size of the droplets produced was similar to the size of DMSO droplets not containing oil (the oil and the DMSO were slightly miscible, but remained in layers for many hours and thus are "immiscible" for the present purpose). Scans of the DMSO-only spots had significantly larger diameters than the aqueous spots since DMSO tends to dissolve the nitrocellulose upper layer on the FAST™ slides. DMSO/oil spot sizes formed on the same substrate were much more consistent, indicating that the oil served as a protective layer between the DMSO and the substrate.

We claim:

1. A method for generating a droplet comprised of at least two immiscible fluids, the method comprising applying focused acoustic energy to a fluid-containing reservoir containing the at least two immiscible fluids, wherein the focused acoustic energy is applied in a manner effective to eject a droplet of fluid from the reservoir.

2. The method of claim 1, wherein the immiscible fluids have different viscosities.

3. The method of claim 2, wherein at least one of the immiscible fluids has a viscosity of at least about 10 cps.

4. The method of claim 3, wherein at least one of the immiscible fluids has a viscosity of at least about 100 cps.

5. The method of claim 3, wherein one of the fluids has a viscosity in the range of approximately 10 cps to approximately 10,000 cps and another of the fluids has a viscosity of less than about 0.3 cps.

6. The method of claim 1, wherein one of the fluids is aqueous and another of the fluids is nonaqueous.

7. The method of claim 6, wherein the nonaqueous fluid is comprised of a lipidic material.

8. The method of claim 7, wherein the aqueous fluid contains a biomolecule.

9. The method of claim 7, wherein the nonaqueous fluid contains a biomolecule.

10. The method of either claim 8 or claim 9, wherein the biomolecule is selected from the group consisting of DNA, RNA, antisense oligonucleotides, peptides, proteins, ribosomes and enzyme cofactors.

11. The method of claim 10, wherein the biomolecule is DNA.

12. The method of claim 10, wherein the biomolecule is RNA.

13. The method of claim 10, wherein the biomolecule is an antisense oligonucleotide.

14. The method of claim 10, wherein the biomolecule is a peptide or protein.

15. The method of claim 14, wherein the biomolecule is a protein.

16. The method of claim 15, wherein the protein is a fluorescent protein.

17. The method of claim 10, wherein the biomolecule is a ribosome.

18. The method of claim 10, wherein the biomolecule is an enzyme cofactor.

19. The method of claim 18, wherein the biomolecule is biotin.

20. The method of claim 8, wherein the droplet comprises the biomolecule in the aqueous fluid encapsulated in the lipidic material.

21. The method of any one of claims 7, 8, 9, or 20, wherein the lipidic material is comprised of a phospholipid.

22. The method of claim 21, wherein the phospholipid is a phosphorylated diacyl glyceride.

23. The method of claim 21, wherein the phospholipid is selected from the group consisting of diacyl phosphatidylcholines, diacyl phosphatidylethanolamines, diacyl phosphatidylserines, diacyl phosphatidylinositols, diacyl phosphatidylglycerols, diacyl phosphatidic acids, and mixtures thereof, wherein each acyl group contains about 10 to about 22 carbon atoms and is saturated or unsaturated.

24. The method of any one of claims 7, 8, 9 or 20, wherein the lipidic material is selected from the group consisting of fatty acids, fatty acid esters, fatty alcohols, glycolipids, oils and waxes.

25. The method of either claim 8 or claim 9, wherein the biomolecule is a pharmaceutical agent.

26. The method of claim 1, wherein one of the fluids is a liquid metal.

27. The method of claim 26, wherein the metal is selected from the group consisting of mercury, aluminum, solder, gold, silver, plutonium, americium, and mixtures thereof.

28. The method of claim 26, wherein one of the fluids is a superconducting alloy.

29. The method of claim 26, wherein another of the fluids is a wax.

30. The method of claim 26, wherein another of the fluids is a ceramic material, a precursor to a ceramic material, an amorphous material, or a precursor to a ceramic material.

31. The method of claim 30, wherein another of the fluids is glass.

32. The method of claim 1, wherein one of the fluids is an alpha particle emitter and another of the fluids is comprised of a material that is transparent to alpha radiation.

33. The method of claim 32, wherein the alpha particle emitter is plutonium.

34. The method of claim 32, wherein the alpha particle emitter is americium.

35. A method for generating a droplet comprised of a first fluid substantially encapsulated in a second fluid, comprising applying focused acoustic energy to a reservoir containing (a) a lower layer having a first thickness and comprised of the first fluid, and (b) an upper layer having a second thickness and comprised of the second fluid, wherein the first and second fluids are immiscible, and further wherein the focused acoustic energy is applied in a manner effective to eject a droplet from the reservoir, and wherein the second thickness is less than about 10% of the first thickness.

36. The method of claim 35, wherein the second thickness is in the range of about 0.1% to 5% of the first thickness.

37. The method of claim 35, wherein the upper layer is a molecular monolayer.

38. The method of claim 35, wherein the upper layer is a molecular bilayer.

39. A method for generating a droplet comprised of a biomolecule encapsulated in a lipidic material, comprising applying focused acoustic energy to a reservoir containing (a) a lower fluid layer having a first thickness and comprised of an aqueous fluid containing the biomolecule, and (b) an upper fluid layer having a second thickness and comprised of the lipidic material, wherein the focused acoustic energy is applied in a manner effective to eject a droplet from the reservoir, and wherein the second thickness is less than about 10% of the first thickness.

40. The method of claim 39, wherein the second thickness is in the range of about 0.1% to 5% of the first thickness.

41. The method of claim 39, wherein the upper layer is a molecular monolayer.

42. The method of claim 39, wherein the upper layer is a molecular bilayer.

43. The method of either claim 35 or claim 39, wherein a substrate is positioned in proximity to the reservoir such that one surface of the substrate faces the reservoir and is substantially parallel to the surface of the fluid therein, whereby the fluid droplet generated by the focused acoustic energy is ejected onto the substrate surface.

44. The method of claim 39, wherein the lipidic material further comprises a molecular moiety selected to provide receptor binding sites on the droplet surface.

45. A method for generating an array of droplets on a substrate surface, each droplet comprised of at least two immiscible fluids, the method comprising applying focused acoustic energy to each of a plurality of fluid-containing reservoirs each containing at least two immiscible fluids, wherein the focused acoustic energy is applied in a manner effective to eject a droplet of fluid from each reservoir toward a different site on a substrate surface.

46. A method for generating an array of droplets on a substrate surface, each droplet comprised of an aqueous fluid and a lipidic fluid, the method comprising applying focused acoustic energy to each of a plurality of fluid-containing reservoirs each containing (a) a lower layer having a first thickness and comprised of the aqueous fluid, and (b) an upper layer having a second thickness and comprised of the lipidic fluid, wherein the focused acoustic energy is applied in a manner effective to eject a droplet from each reservoir toward a different site on a substrate surface, and wherein the second thickness is less than about 10% of the first thickness.

47. The method of claim 46, wherein the second thickness is in the range of about 0.1% to 5% of the first thickness.

48. The method of claim 46, wherein the upper layer is a molecular monolayer.

49. The method of claim 46, wherein the upper layer is a molecular bilayer.

50. The method of claim 46, wherein the aqueous fluid contains a biomolecule.

51. The method of claim 46, wherein the nonaqueous fluid contains a biomolecule.

52. The method of claim 51, wherein the biomolecule is selected from the group consisting of DNA, RNA, antisense oligonucleotides, peptides, proteins, ribosomes and enzyme cofactors.

53. A device for acoustically ejecting a droplet of at least two immiscible fluids from each of a plurality of fluid reservoirs, comprising:

a plurality of fluid reservoirs each containing two or more immiscible fluids;

an ejector comprising an acoustic radiation generator for generating acoustic radiation and a focusing means for focusing the acoustic radiation at a focal point sufficiently near the fluid surface in each of the reservoirs so as to eject a fluid droplet therefrom; and a means for positioning the ejector in acoustic coupling relationship to each of the reservoirs.

54. The device of claim 53, wherein each of the reservoirs is removable from the device.

55. The device of claim 53, wherein the reservoirs comprise individual wells in a well plate.

56. The device of claim 53, wherein the reservoirs are arranged in an array.

57. The device of claim 53, wherein the reservoirs are substantially acoustically indistinguishable.

58. The device of claim 53, comprising at least about 10,000 reservoirs.

59. The device of claim 58, comprising at least about 100,000 reservoirs.

60. The device of claim 59, comprising in the range of about 100,000 to about 4,000,000 reservoirs.

61. The device of claim 53, wherein each reservoir is adapted to contain no more than about 100 nanoliters of fluid.

62. The device of claim 53, wherein each reservoir is adapted to contain no more than about 10 nanoliters of fluid.

63. The device of claim 53, wherein the ejector positioning means is adapted to eject droplets from each reservoir in a predetermined sequence.

64. The device of claim 53, further comprising means for maintaining the fluid in each reservoir at a constant temperature.

65. The device of claim 64, wherein the constant temperature is no more than about 10° C. above the melting point of the fluid.

66. The device of claim 65, wherein the constant temperature is no more than about 5° C. above the melting point of the fluid.

67. The device of claim 53, wherein the acoustic coupling relationship comprises positioning the ejector such that the acoustic radiation is generated and focused external to the reservoirs.

68. The device of claim 67, wherein the acoustic coupling relationship between the ejector and the fluid in each reservoir is established by providing an acoustically conductive medium between the ejector and each reservoir.

69. The device of claim 53, wherein acoustic coupling between the ejector and the fluid in each reservoir is established at a predetermined distance between the ejector and each reservoir.

70. The device of claim 53, comprising a single ejector.

* * * * *

UNITED STATES PATENT AND TRADEMARK OFFICE
CERTIFICATE OF CORRECTION

PATENT NO. : 6,548,308 B2
DATED : April 15, 2003
INVENTOR(S) : Richard N. Ellson et al.

It is certified that error appears in the above-identified patent and that said Letters Patent is hereby corrected as shown below:

Column 18,
Line 23, please delete "ceramic" and insert -- amorphous --

Column 19,
Line 35, please delete "nonaqueous" and insert -- lipidic --

Signed and Sealed this

Twenty-seventh Day of April, 2004

JON W. DUDAS
*Acting Director of the United States Patent and Trademark Office*